US011238316B2

United States Patent
Mayes et al.

(10) Patent No.: US 11,238,316 B2
(45) Date of Patent: Feb. 1, 2022

(54) DETECTION OF COUNTERFEIT VIRTUAL OBJECTS

(71) Applicant: Roblox Corporation, San Mateo, CA (US)

(72) Inventors: Robin E. Mayes, San Francisco, CA (US); Courtland R. Caldwell, Millbrae, CA (US); Rebecca L. Herndon, San Francisco, CA (US); Hariharan Natarajan, Fremont, CA (US)

(73) Assignee: Roblox Corporation, San Mateo, CA (US)

( * ) Notice: Subject to any disclaimer, the term of this patent is extended or adjusted under 35 U.S.C. 154(b) by 138 days.

(21) Appl. No.: 16/703,823

(22) Filed: Dec. 4, 2019

(65) Prior Publication Data

US 2021/0174132 A1   Jun. 10, 2021

(51) Int. Cl.
   *G06K 9/62* (2006.01)
   *A63F 13/75* (2014.01)
   *G06K 9/00* (2006.01)

(52) U.S. Cl.
   CPC .............. *G06K 9/627* (2013.01); *A63F 13/75* (2014.09); *G06K 9/00208* (2013.01)

(58) Field of Classification Search
   CPC ...... G06K 9/627; G06K 9/00208; A63F 13/75
   See application file for complete search history.

(56) References Cited

U.S. PATENT DOCUMENTS

| 2007/0183669 A1* | 8/2007 | Owechko | G06K 9/6292 |
| | | | 382/224 |
| 2013/0034337 A1* | 2/2013 | Hefeeda | H04N 5/913 |
| | | | 386/252 |

(Continued)

FOREIGN PATENT DOCUMENTS

| WO | 2014/081394 | 5/2014 |
| WO | 2019/207170 | 10/2019 |

OTHER PUBLICATIONS

USPTO, International Search Report for International Patent Application No. PCT/US2019/067929, dated Mar. 18, 2020, 2 pages.

(Continued)

*Primary Examiner* — Santiago Garcia
(74) *Attorney, Agent, or Firm* — IP Spring (57) ABSTRACT

Implementations described herein relate to methods, systems, and computer-readable media to detect counterfeit virtual three-dimensional (3D) objects. In some implementations, a computer-implemented method includes receiving an unauthenticated virtual 3D object. The method further includes determining a plurality of two-dimensional (2D) views of the unauthenticated virtual 3D object. In some implementations, the plurality of 2D views include at least two 2D views and each view of the plurality of 2D views is captured from a respective viewpoint. The method further includes calculating a hash value for each 2D view of the plurality of 2D views. The method further includes determining whether the respective hash values of at least two of the plurality of 2D views match hash values of corresponding 2D views of an authentic virtual 3D object and if it is determined that the respective hash values match, classifying the unauthenticated virtual 3D object as a counterfeit object.

29 Claims, 5 Drawing Sheets

(56) References Cited

U.S. PATENT DOCUMENTS

| | | |
|---|---|---|
| 2013/0124359 A1 | 5/2013 | Hedges et al. |
| 2014/0139647 A1 | 5/2014 | Nagatani |
| 2015/0071486 A1* | 3/2015 | Rhoads ................ G07F 7/0813 382/100 |
| 2016/0221114 A1* | 8/2016 | Dietrich ................ B29C 64/10 |
| 2017/0372516 A1* | 12/2017 | Evans ................... G06T 15/20 |
| 2020/0035011 A1* | 1/2020 | Bilgili ................... G06T 15/20 |
| 2020/0167995 A1* | 5/2020 | Hare ................ G06K 9/00208 |
| 2020/0175001 A1 | 6/2020 | Malan |
| 2021/0174132 A1 | 6/2021 | Mayes et al. |

OTHER PUBLICATIONS

USPTO, Written Opinion for International Patent Application No. PCT/US2019/067929, dated Mar. 18, 2020, 8 pages.

Bjelland, et al., "Practical use of Approximate Hash Based Marching in digital investigations", Digital Investigation, vol. 11, Supp. 1, May 2014, pp. S18-S26.

Huang, et al., "An Accurate Method for Voxelizing Polygon Meshes", IEEE Symposium on Volume Visualization (Cat. No. 989EX300), 1998, 9 pages.

Jones, "The Production of Volume Data from Triangular Meshes Using Voxelisation", Computer Graphics Forum, vol. 15, No. 5, Dec. 1996, pp. 311-318.

Zauner, "Implementation and Benchmarking of Perceptual Image Hash Functions", Sichere Informationssysteme, Hagenberg, 2010, 107 pages.

USPTO, Non-final Office Action for U.S. Appl. No. 17/127,714, dated Sep. 1, 2021, 8 pages.

* cited by examiner

DETECTION OF COUNTERFEIT VIRTUAL OBJECTS

TECHNICAL FIELD

Embodiments relate generally to computer-based gaming, and more particularly, to methods, systems, and computer readable media for detection of counterfeit virtual objects.

BACKGROUND

Some online platforms (e.g. gaming platforms, media exchange platforms, etc.), allow users to connect with each other, interact with each other (e.g., within a game), create games, and share information with each other via the Internet. Users of online gaming platforms may participate in multiplayer gaming environments or virtual environments (e.g., three-dimensional environments), design custom gaming environments, design characters and avatars, decorate avatars, exchange virtual items/objects with other users, communicate with other users using audio or text messaging, and so forth. Environments such as metaverse or multiverse environments can also enable users that participate to share, sell, or trade objects of their creation with other users.

In order to prevent counterfeit objects from being featured on the gaming platform, a need may exist for a method to detect counterfeit virtual objects, by comparison with genuine virtual objects.

Some implementations were conceived in light of the above.

SUMMARY

According to an aspect, a computer-implemented method is provided to detect counterfeit virtual three-dimensional (3D) objects. The method includes: receiving an unauthenticated virtual 3D object; determining a plurality of two-dimensional (2D) views of the unauthenticated virtual 3D object; calculating a hash value for each 2D view of the plurality of 2D views; determining whether the respective hash values of at least two of the plurality of 2D views match hash values of corresponding 2D views of an authentic virtual 3D object; and if it is determined that the respective hash values match, classifying the unauthenticated virtual 3D object as a counterfeit 3D object.

In some implementations, the plurality of 2D views include at least two 2D views and each view of the plurality of 2D views is captured from a respective viewpoint.

In some implementations, determining the plurality of 2D views of the unauthenticated virtual 3D object includes determining the plurality of 2D views under predetermined lighting conditions. In some implementations, the hash value is calculated using a perceptual hash function.

In some implementations, determining whether the respective hash values match includes: computing a distance value between the respective hash value of at least two 2D views of the plurality of 2D views and the hash value of corresponding 2D views of the authentic virtual 3D object; determining that the respective hash values match based on determination that at least a threshold number of the distance values meets a threshold distance value.

In some implementations, receiving the unauthenticated virtual 3D object includes receiving a 3D mesh of the unauthenticated virtual 3D object. In some implementations, the 3D mesh includes texture information.

In some implementations, the at least two 2D views are selected based on a category of the unauthenticated virtual 3D object. In some implementations, the viewpoint is determined based on a user visible portion of the virtual 3D object. In some implementations, the virtual 3D object is worn by a virtual avatar and the user visible portion depends on a pose of the virtual avatar.

In some implementations, the method further includes after classifying the unauthenticated virtual 3D object as the counterfeit 3D object, excluding the counterfeit 3D object from a listing in a virtual platform. In some implementations, the method further includes performing the determining a plurality of times. In some implementations, the determining is performed each of the plurality of times with a different authentic virtual 3D object.

In some implementations, the method further includes if it is determined that the respective hash values do not match, classifying the unauthenticated virtual 3D object as a genuine 3D object. In some implementations, the method further includes after classifying the unauthenticated virtual 3D object as the genuine 3D object, storing the plurality of 2D views of the unauthenticated virtual 3D object.

According to another aspect, a computer-implemented method is provided to detect counterfeit virtual three-dimensional (3D) objects. The method includes: receiving an unauthenticated virtual 3D object; determining a plurality of two-dimensional (2D) views of the unauthenticated virtual 3D object; calculating a hash value for each 2D view of the plurality of 2D views; determining a plurality of distance values; determining an aggregate distance value based on the plurality of distance values; and classifying the unauthenticated virtual 3D object as a counterfeit 3D object if the aggregate distance value meets a predetermined threshold distance value.

In some implementations, each distance value is indicative of distance between a respective hash value of a 2D view of the plurality of 2D views and a hash value of a corresponding 2D view of an authentic virtual 3D object.

In some implementations, each view of the plurality of 2D views is captured from a respective viewpoint.

In some implementations, an object type of the unauthenticated virtual 3D object and the object type of the authentic virtual 3D object are the same.

In some implementations, the plurality of 2D views are selected based at least in part on the object type of the unauthenticated virtual 3D object.

In some implementations, determining the plurality of 2D views of the unauthenticated virtual 3D object includes determining the plurality of 2D views under predetermined lighting conditions.

In some implementations, the method further includes performing the determining a plurality of times, and the determining is performed each of the plurality of times with a different authentic virtual 3D object.

In some implementations, the method further includes classifying the unauthenticated virtual 3D object as a genuine 3D object if the aggregate distance value does not meet a predetermined threshold distance value.

According to another aspect, a non-transitory computer-readable medium has instructions that, responsive to execution by a processing device, causes the processing device to perform operations that include: receiving an unauthenticated virtual 3D object; determining a plurality of two-dimensional (2D) views of the unauthenticated virtual 3D object; calculating a hash value for each 2D view of the plurality of 2D views; determining a plurality of distance values, wherein; determining an aggregate distance value based on the plurality of distance values; and classifying the unauthenticated virtual 3D object as a counterfeit 3D object if the aggregate distance value meets a predetermined threshold distance value.

In some implementations, each distance value is indicative of distance between a respective hash value of a 2D view of the plurality of 2D views and a hash value of a corresponding 2D view of an authentic virtual 3D object. In some implementations, each 2D view of the plurality of 2D views is captured from a respective viewpoint.

In some implementations, determining the plurality of 2D views of the unauthenticated virtual 3D object includes determining the plurality of 2D views under predetermined lighting conditions. In some implementations, the hash value is calculated using a perceptual hash function.

In some implementations, the plurality of views are selected based at least in part on an object type of the unauthenticated virtual 3D object.

In some implementations, the operations further include classifying the unauthenticated virtual 3D object as a genuine 3D object if the aggregate distance value does not meet the predetermined threshold distance value.

According to still another aspect, a system includes: a memory with instructions stored thereon; and a processing device, coupled to the memory, the processing device configured to access the memory and execute the instructions. In some implementations, the instructions cause the processing device to perform operations including: receiving an unauthenticated virtual 3D object; determining a plurality of two-dimensional (2D) views of the unauthenticated virtual 3D object; calculating a hash value for each 2D view of the plurality of 2D views; determining whether the respective hash values of at least two 2D views of the plurality of 2D views of the unauthenticated virtual 3D object match hash values of corresponding 2D views of an authentic virtual 3D object; and if it is determined that the respective hash values match, classifying the unauthenticated virtual 3D object as a counterfeit 3D object.

In some implementations, each 2D view of the plurality of 2D views is captured from a respective viewpoint.

In some implementations, the hash value is calculated using a perceptual hash function. In some implementations, the plurality of views are selected based at least in part on an object type of the unauthenticated virtual 3D object.

In some implementations, the operations further include performing the determining a plurality of times. In some implementations, the determining is performed each of the plurality of times with a different authentic virtual 3D object.

In some implementations, the operations further include if it is determined that the respective hash values do not match, classifying the unauthenticated virtual 3D object as a genuine 3D object.

DETAILED DESCRIPTION

In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some embodiments", "an embodiment", "an example embodiment", etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be effected in connection with other embodiments whether or not explicitly described.

Online gaming platforms (also referred to as "user-generated content platforms" or "user-generated content systems") offer a variety of ways for users to interact with one another. For example, users of an online gaming platform may work together towards a common goal, share various virtual gaming items, send electronic messages to one another, and so forth. Users of an online gaming platform may join games as virtual characters, playing game-specific roles. For example, a virtual character may be part of a team or multiplayer environment wherein each character is assigned a certain role and has associated parameters, e.g., clothing, armor, weaponry, skills, etc. that correspond to the role. In another example, a virtual character may be joined by one or more non-player characters (NPC) which may be computer-generated characters, e.g., when a single player is part of a game.

An online gaming platform may also allow users (developers) of the platform to create new games and characters. For example, users of the online gaming platform may be enabled to create, design, and/or customize new characters (avatars), new animation packages, and make them available to other users.

New characters and animation packages (virtual objects) may be traded, bartered, or bought and sold in online marketplaces for virtual and/or real currency. The virtual objects may be copied and redistributed without the reseller's or purchaser's awareness of the counterfeit nature of the virtual object(s).

Flooding of counterfeit virtual objects in the marketplace can be difficult to detect, and the volume and nature of the virtual objects can make it difficult for human intervention in the detection of the counterfeit virtual objects.

An objective of a game platform owner or administrator is the mitigation of counterfeit objects and provide an incentive to creators of original content. A technical problem for game platform operators is the detection of counterfeit virtual objects across the game platform(s).

Early detection of counterfeit virtual objects may make it difficult and/or expensive for a creator of a counterfeit virtual object to create and propagate counterfeit virtual objects. A game platform that prevents the upload of counterfeit virtual objects can effectively deter counterfeit object creators.

In order to circumvent detection, creators can sometimes manipulate an original virtual object to create a manipulated object. The manipulated object may be classified by some counterfeit detection techniques as original, even though the difference between the manipulated object and the genuine object may not be perceptible.

The present disclosure addresses the above-described drawbacks by detecting counterfeit objects that are similar to genuine objects that are known to the game platform. The similarity of the counterfeit virtual object to an original virtual object (perceptual hash matching) is utilized for the detection of counterfeit objects.

Perceptual hash matching utilizes perceptual hash functions that are fingerprints of multimedia files (image files, audio files, video files, etc.) derived from various features from its content. Perceptual hashes of two files are close to one another if their underlying features are similar. Perceptual hash functions are designed to be robust to take into account transformations (rotation, skew, contrast adjustment, use of different compression/formats of a file, etc.) of a file and yet detect the transformed file as being similar to the original file.

Figure 1:
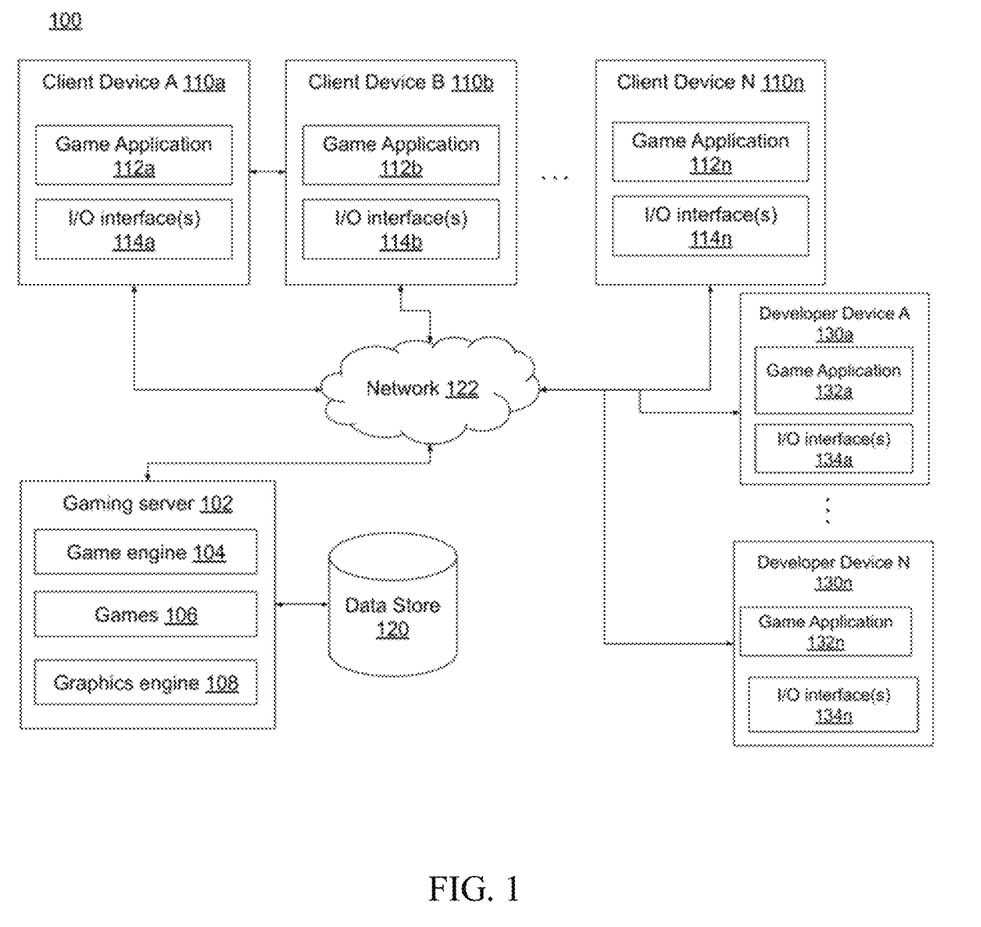
FIG. 1 is a diagram of an example system architecture for detection of counterfeit virtual objects, in accordance with some implementations.

FIG. 1 illustrates an example system architecture 100, in accordance with some implementations of the disclosure. FIG. 1 and the other figures use like reference numerals to identify like elements. A letter after a reference numeral, such as "110," indicates that the text refers specifically to the element having that particular reference numeral. A reference numeral in the text without a following letter, such as "110," refers to any or all of the elements in the figures bearing that reference numeral (e.g. "110" in the text refers to reference numerals "110a," "110b," and/or "110n" in the figures).

The system architecture 100 (also referred to as "system" herein) includes online gaming server 102, data store 120, client devices 110a, 110b, and 110n (generally referred to as "client device(s) 110" herein), and developer devices 130a and 130n (generally referred to as "developer device(s) 130" herein). Gaming server 102, data store 120, client devices 110, and developer devices 130 are coupled via network 122. In some implementations, client devices(s) 110 and developer device(s) 130 may refer to the same or same type of device.

Online gaming server 102 can include, among other things, a game engine 104, one or more games 106, and graphics engine 108. A client device 110 can include a game application 112, and input/output (I/O) interfaces 114 (e.g., input/output devices). The input/output devices can include one or more of a microphone, speakers, headphones, display device, mouse, keyboard, game controller, touchscreen, virtual reality consoles, etc.

A developer device 130 can include a game application 132, and input/output (I/O) interfaces 134 (e.g., input/output devices). The input/output devices can include one or more of a microphone, speakers, headphones, display device, mouse, keyboard, game controller, touchscreen, virtual reality consoles, etc.

System architecture 100 is provided for illustration. In different implementations, the system architecture 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a 5G network, a Long Term Evolution (LTE) network, etc.), routers, hubs, switches, server computers, or a combination thereof.

In some implementations, the data store 120 may be a non-transitory computer readable memory (e.g., random access memory), a cache, a drive (e.g., a hard drive), a flash drive, a database system, or another type of component or device capable of storing data. The data store 120 may also include multiple storage components (e.g., multiple drives or multiple databases) that may also span multiple computing devices (e.g., multiple server computers).

In some implementations, the online gaming server 102 can include a server having one or more computing devices (e.g., a cloud computing system, a rackmount server, a server computer, cluster of physical servers, etc.). In some implementations, the online gaming server 102 may be an independent system, may include multiple servers, or be part of another system or server.

In some implementations, the online gaming server 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online gaming server 102 and to provide a user with access to online gaming server 102. The online gaming server 102 may also include a web site (e.g., a webpage) or application back-end software that may be used to provide a user with access to content provided by online gaming server 102. For example, users may access online gaming server 102 using the game application 112 on client devices 110.

In some implementations, online gaming server 102 may be a type of social network providing connections between users or a type of user-generated content system that allows users (e.g., end-users or consumers) to communicate with other users on the online gaming server 102, where the communication may include voice chat (e.g., synchronous and/or asynchronous voice communication), video chat (e.g., synchronous and/or asynchronous video communication), or text chat (e.g., synchronous and/or asynchronous text-based communication). In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, online gaming server 102 may be a virtual gaming server. For example, the gaming server may provide single-player or multiplayer games to a community of users that may access or interact with games using client devices 110 via network 122. In some implementations, games (also referred to as "video game," "online game," or "virtual game" herein) may be two-dimensional (2D) games, three-dimensional (3D) games (e.g., 3D user-generated games), virtual reality (VR) games, or augmented reality (AR) games, for example. In some implementations, users may participate in gameplay with other users. In some implementations, a game may be played in real-time with other users of the game.

In some implementations, gameplay may refer to the interaction of one or more players using client devices (e.g., 110) within a game (e.g., 106) or the presentation of the interaction on a display or other output device (e.g., 114) of a client device 110.

In some implementations, a game 106 can include an electronic file that can be executed or loaded using software, firmware or hardware configured to present the game content (e.g., digital media item) to an entity. In some implementations, a game application 112 may be executed and a game 106 rendered in connection with a game engine 104. In some implementations, a game 106 may have a common set of rules or common goal, and the environment of a game 106 share the common set of rules or common goal. In some implementations, different games may have different rules or goals from one another.

In some implementations, games may have one or more environments (also referred to as "gaming environments" or "virtual environments" herein) where multiple environments may be linked. An example of an environment may be a three-dimensional (3D) environment. The one or more environments of a game application 112 or 132 may be collectively referred to a "world" or "gaming world" or "virtual world" or "universe" herein. An example of a world may be a 3D world of a game 106. For example, a user may build a virtual environment that is linked to another virtual environment created by another user. A character of the virtual game may cross the virtual border to enter the adjacent virtual environment.

It may be noted that 3D environments or 3D worlds use graphics that use a three-dimensional representation of geometric data representative of game content (or at least present game content to appear as 3D content whether or not 3D representation of geometric data is used). 2D environments or 2D worlds use graphics that use two-dimensional representation of geometric data representative of game content.

In some implementations, the online gaming server 102 can host one or more games 106 and can permit users to interact with the games 106 using a game application 112 of client devices 110. Users of the online gaming server 102 may play, create, interact with, or build games 106, communicate with other users, and/or create and build objects (e.g., also referred to as "item(s)" or "game objects" or "virtual game item(s)" herein) of games 106. For example, in generating user-generated virtual items, users may create characters, decoration for the characters, one or more virtual environments for an interactive game, or build structures used in a game 106, among others. In some implementations, users may buy, sell, or trade game virtual game objects, such as in-platform currency (e.g., virtual currency), with other users of the online gaming server 102. In some implementations, online gaming server 102 may transmit game content to game applications (e.g., 112). In some implementations, game content (also referred to as "content" herein) may refer to any data or software instructions (e.g., game objects, game, user information, video, images, commands, media item, etc.) associated with online gaming server 102 or game applications. In some implementations, game objects (e.g., also referred to as "item(s)" or "objects" or "virtual objects" or "virtual game item(s)" herein) may refer to objects that are used, created, shared, or otherwise depicted in game engine 104 or graphics engine 108 of the online gaming server 102 or game applications 112 of the client devices 110. For example, game objects may include a part, model, character, accessories, tools, weapons, clothing, buildings, vehicles, currency, flora, fauna, components of the aforementioned (e.g., windows of a building), and so forth.

It may be noted that the online gaming server 102 hosting games 106, is provided for purposes of illustration, rather than limitation. In some implementations, online gaming server 102 may host one or more media items that can include communication messages from one user to one or more other users. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, a game 106 may be associated with a particular user or a particular group of users (e.g., a private game), or made widely available to users with access to the online gaming server 102 (e.g., a public game). In some implementations, where online gaming server 102 associates one or more games 106 with a specific user or group of users, online gaming server 102 may associated the specific user(s) with a game 102 using user account information (e.g., a user account identifier such as username and password).

In some implementations, online gaming server 102 or client devices 110 may include a game engine 104 or game application 112. In some implementations, game engine 104 may be used for the development or execution of games 106. For example, game engine 104 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the game engine 104 may generate commands that help compute and render the game (e.g., rendering commands, collision commands, physics commands, etc.) In some implementations, game applications 112 of client devices 110/116, respectively, may work independently, in collaboration with game engine 104 of online gaming server 102, or a combination of both.

In some implementations, both the online gaming server 102 and client devices 110 may execute a game engine (104 and 112, respectively). The online gaming server 102 using game engine 104 may perform some or all the game engine functions (e.g., generate physics commands, rendering commands, etc.), or offload some or all the game engine functions to game engine 104 of client device 110. In some implementations, each game 106 may have a different ratio between the game engine functions that are performed on the online gaming server 102 and the game engine functions that are performed on the client devices 110. For example, the game engine 104 of the online gaming server 102 may be used to generate physics commands in cases where there is a collision between at least two game objects, while the additional game engine functionality (e.g., generate rendering commands) may be offloaded to the client device 110. In some implementations, the ratio of game engine functions performed on the online gaming server 102 and client device 110 may be changed (e.g., dynamically) based on gameplay conditions. For example, if the number of users participating in gameplay of a particular game 106 exceeds a threshold number, the online gaming server 102 may perform one or more game engine functions that were previously performed by the client devices 110.

For example, users may be playing a game 106 on client devices 110, and may send control instructions (e.g., user inputs, such as right, left, up, down, user election, or character position and velocity information, etc.) to the online gaming server 102. Subsequent to receiving control instructions from the client devices 110, the online gaming server 102 may send gameplay instructions (e.g., position and velocity information of the characters participating in the group gameplay or commands, such as rendering commands, collision commands, etc.) to the client devices 110 based on control instructions. For instance, the online gaming server 102 may perform one or more logical operations (e.g., using game engine 104) on the control instructions to generate gameplay instruction(s) for the client devices 110. In other instances, online gaming server 102 may pass one or more or the control instructions from one client device 110 to other client devices (e.g., from client device 110a to client device 110b) participating in the game 106. The client devices 110 may use the gameplay instructions and render the gameplay for presentation on the displays of client devices 110.

In some implementations, the control instructions may refer to instructions that are indicative of in-game actions of a user's character. For example, control instructions may include user input to control the in-game action, such as right, left, up, down, user selection, gyroscope position and orientation data, force sensor data, etc. The control instructions may include character position and velocity information. In some implementations, the control instructions are sent directly to the online gaming server 102. In other implementations, the control instructions may be sent from a client device 110 to another client device (e.g., from client device 110b to client device 110n), where the other client device generates gameplay instructions using the game engine 104. The control instructions may include instructions to play a voice communication message or other sounds from another user on an audio device (e.g., speakers, headphones, etc.), for example voice communications or other sounds generated using the audio spatialization techniques as described herein.

In some implementations, gameplay instructions may refer to instructions that allow a client device 110 to render gameplay of a game, such as a multiplayer game. The gameplay instructions may include one or more of user input (e.g., control instructions), character position and velocity information, or commands (e.g., physics commands, rendering commands, collision commands, etc.).

In some implementations, the online gaming server 102 may store characters created by users in the data store 120. In some implementations, the online gaming server 102 maintains a character catalog and game catalog that may be presented to users. In some implementations, the game catalog includes images of games stored on the online gaming server 102. In addition, a user may select a character (e.g., a character created by the user or other user) from the character catalog to participate in the chosen game. The character catalog includes images of characters stored on the online gaming server 102. In some implementations, one or more of the characters in the character catalog may have been created or customized by the user. In some implementations, the chosen character may have character settings defining one or more of the components of the character.

In some implementations, a user's character can include a configuration of components, where the configuration and appearance of components and more generally the appearance of the character may be defined by character settings. In some implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by the online gaming server 102.

In some implementations, the client device(s) 110 may each include computing devices such as personal computers (PCs), mobile devices (e.g., laptops, mobile phones, smart phones, tablet computers, or netbook computers), network-connected televisions, gaming consoles, etc. In some implementations, a client device 110 may also be referred to as a "user device." In some implementations, one or more client devices 110 may connect to the online gaming server 102 at any given moment. It may be noted that the number of client devices 110 is provided as illustration. In some implementations, any number of client devices 110 may be used.

In some implementations, each client device 110 may include an instance of the game application 112, respectively. In one implementation, the game application 112 may permit users to use and interact with online gaming server 102, such as control a virtual character in a virtual game hosted by online gaming server 102, or view or upload content, such as games 106, images, video items, web pages, documents, and so forth. In one example, the game application may be a web application (e.g., an application that operates in conjunction with a web browser) that can access, retrieve, present, or navigate content (e.g., virtual character in a virtual environment, etc.) served by a web server. In another example, the game application may be a native application (e.g., a mobile application, app, or a gaming program) that is installed and executes local to client device 110 and allows users to interact with online gaming server 102. The game application may render, display, or present the content (e.g., a web page, a media viewer) to a user. In an implementation, the game application may also include an embedded media player (e.g., a Flash® player) that is embedded in a web page.

According to aspects of the disclosure, the game application may be an online gaming server application for users to build, create, edit, upload content to the online gaming server 102 as well as interact with online gaming server 102 (e.g., play games 106 hosted by online gaming server 102). As such, the game application may be provided to the client device(s) 110 by the online gaming server 102. In another example, the game application may be an application that is downloaded from a server.

In some implementations, each developer device 130 may include an instance of the game application 132, respectively. In one implementation, the game application 132 may permit a developer user(s) to use and interact with online gaming server 102, such as control a virtual character in a virtual game hosted by online gaming server 102, or view or upload content, such as games 106, images, video items, web pages, documents, and so forth. In one example, the game application may be a web application (e.g., an application that operates in conjunction with a web browser) that can access, retrieve, present, or navigate content (e.g., virtual character in a virtual environment, etc.) served by a web server. In another example, the game application may be a native application (e.g., a mobile application, app, or a gaming program) that is installed and executes local to developer device 130 and allows users to interact with online gaming server 102. The game application may render, display, or present the content (e.g., a web page, a media viewer) to a user. In an implementation, the game application may also include an embedded media player (e.g., a Flash® player) that is embedded in a web page.

According to aspects of the disclosure, the game application 132 may be an online gaming server application for users to build, create, edit, upload content to the online gaming server 102 as well as interact with online gaming server 102 (e.g., provide and/or play games 106 hosted by online gaming server 102). As such, the game application may be provided to the client device(s) 110 by the online gaming server 102. In another example, the game application 132 may be an application that is downloaded from a server. Game application 132 may be configured to interact with online gaming server 102 and obtain access to user credentials, user currency, etc. for one or more games 106 developed, hosted, or provided by a game developer.

In some implementations, a user may login to online gaming server 102 via the game application. The user may access a user account by providing user account information (e.g., username and password) where the user account is associated with one or more characters available to participate in one or more games 106 of online gaming server 102. In some implementations, with appropriate credentials, a game developer may obtain access to game virtual game objects, such as in-platform currency (e.g., virtual currency), avatars, special powers, accessories, that are owned by or associated with other users.

In general, functions described in one implementation as being performed by the online gaming server 102 can also be performed by the client device(s) 110, or a server, in other implementations if appropriate. In addition, the functionality attributed to a particular component can be performed by different or multiple components operating together. The online gaming server 102 can also be accessed as a service provided to other systems or devices through appropriate application programming interfaces (APIs), and thus is not limited to use in websites.

In some implementations, online gaming server 102 may include a graphics engine 108. In some implementations, the graphics engine 108 may be a system, application, or module that permits the online gaming server 102 to provide graphics and animation capability. In some implementations, the graphics engine 108 may perform one or more of the operations described below in connection with the flow charts shown in FIG. 4.

Figure 2:
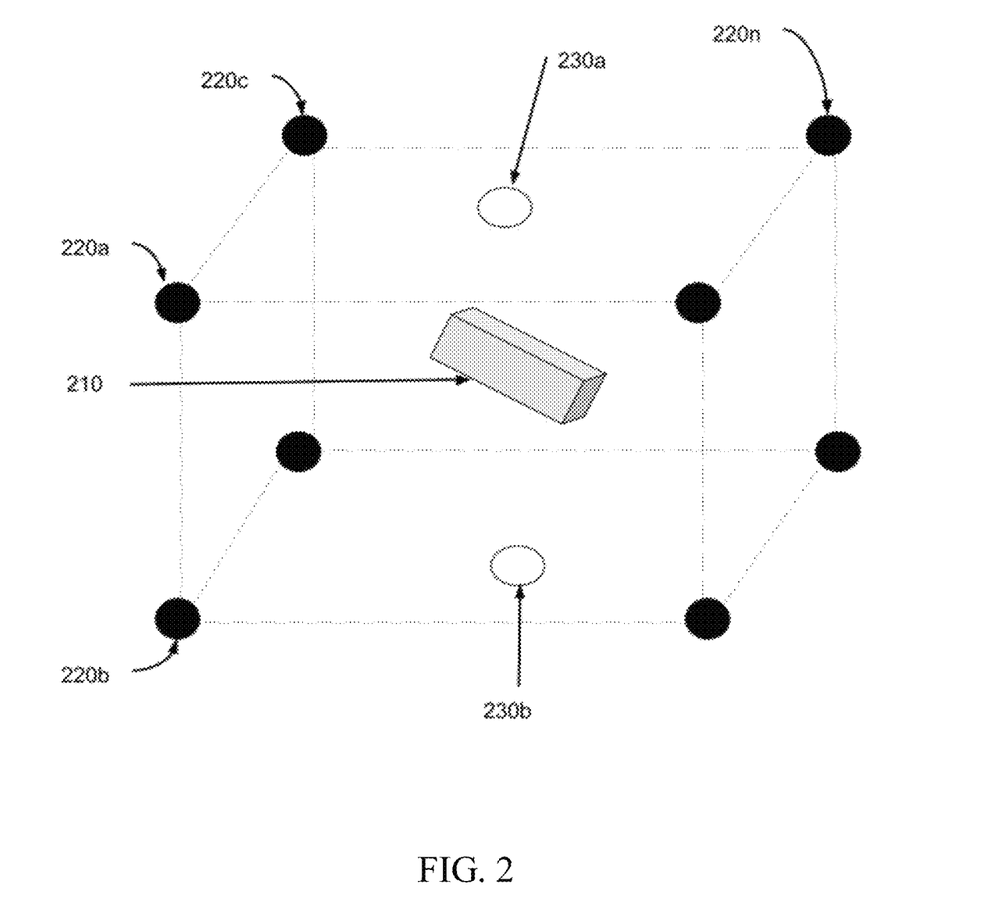
FIG. 2 illustrates example capture of 2D views of a virtual 3D object from different viewpoints, in accordance with some implementations.

FIG. 2 illustrates capture of 2D views of a virtual 3D object from different viewpoints, in accordance with some implementations.

FIG. 2 depicts an example virtual 3D object 210. The virtual 3D object 210 may be received as a model file that is a mathematical representation of the surface of an object in three dimensions.

The virtual 3D object is internally rendered (for example, by graphics engine 108) by gaming server 102. In some implementations, the rendering leads to generation of one or more image(s) based on the received 3D model. In some implementations, the internal rendering may be performed at a resolution different from a resolution specified in a model file.

In some implementations, one or more camera views 220 are utilized to capture 2D images of the rendered virtual 3D object 210.

The camera views shown and described herein may be provided by a "virtual camera" that can be positioned at different viewpoints in the 3D world to generate the camera views and to generate different views. The position(s) and capture resolution of the virtual camera can be updated/changed as well. For example, in some implementations, the camera view may include a feature to zoom in and out, and/or capture an image at a higher or lower resolution.

For example, camera views 220*a*, 220*b*, 220*c*, and 220*n* are illustrative example of camera views that may be positioned in the 3D world to capture images of the virtual 3D object 210.

In some implementations, virtual lighting 230 may be used to create visual effects on the object. In this illustrative example virtual lighting 230*a* may be utilized to illuminate the virtual 3D object from above, and virtual lighting 230*b* may be utilized to illuminate the virtual 3D object from below.

Virtual lighting 230 may include directional lights, spot lights, area lights, volume lights, ambient lights, etc. The positions and types of virtual lighting 230 may be configured based on a direction of viewing of the object. For example, virtual lighting 230 may be placed such that a light vector originating from the virtual lighting is not parallel to the direction of viewing to enable the camera to capture shadows of the object. If the lighting in a scene is follows the normal vector of the viewing frustum, then the camera may not capture shadows that would be present if the light vector and normal frustum were not parallel.

In some implementations, virtual lighting 230 may be configured to create strong edges between features and regions to enable better feature extraction. Feature extraction may be more effective when strong edges are present in the image(s).

In some implementations, objects that include concave features that are normally exposed in a virtual game may utilize more complex lighting arrangements in order to extract the relevant features that may lie within the concavity.

Figure 3:
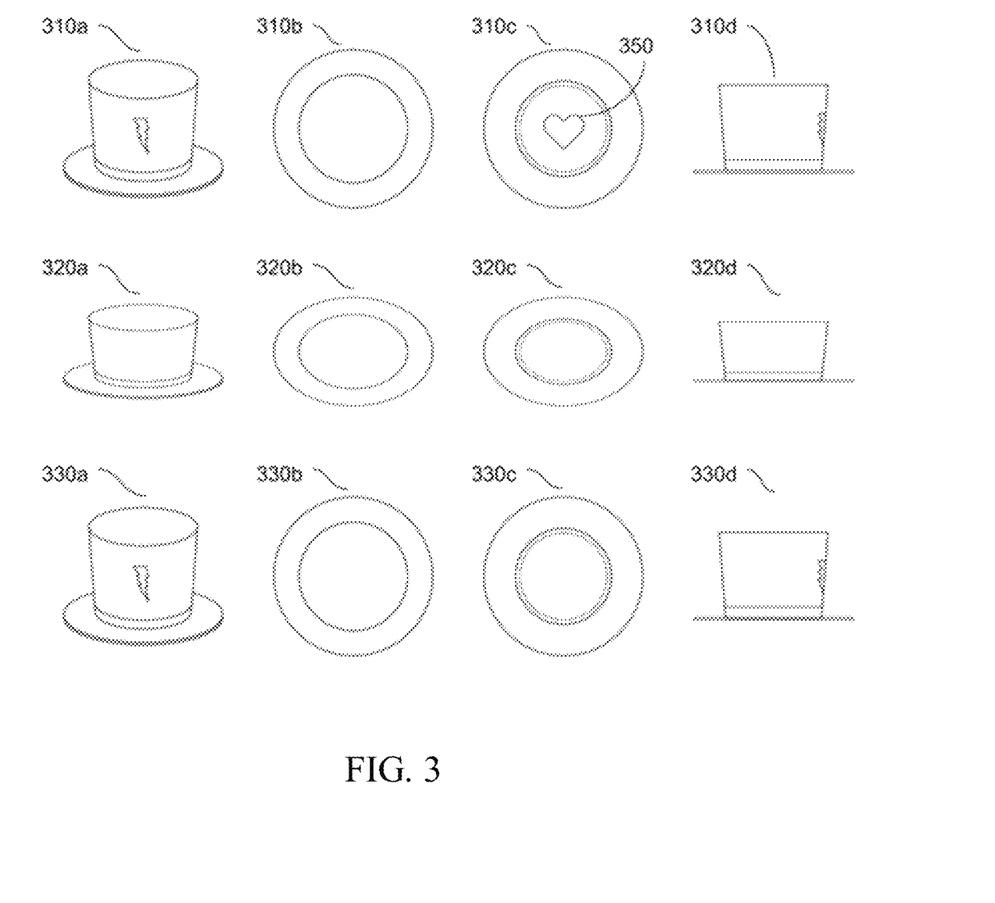
FIG. 3 is a diagram illustrating example two-dimensional (2D) views of a received virtual three-dimensional (3D) object in comparison to a matching virtual three-dimensional (3D) object and a non-matching 3D object, in accordance with some implementations.

FIG. 3 is a diagram illustrating example views of a received virtual three-dimensional (3D) object (310*a*-*d*) in comparison to a non-matching virtual three-dimensional (3D) object (320*a*-*d*) and a matching 3D object (330*a*-*d*). In this illustrative example, 310*a* is a 3D view of the received virtual object, 310*b* is a top of the received virtual object, 310*c* is a bottom view of the received virtual object, and 310*d* is a side view of the received virtual object. Corresponding views of the non-matching virtual object are 320*a*-*d* and of the matching virtual object are 330*a*-*d*.

The 2D views of the received virtual 3D object and other objects can be generated by rendering a 3D model of the object and obtaining 2D views from different viewpoints using a virtual camera. A category type (object type) may be determined for an object from a user-provided label for the object, or based on features of the virtual 3D object identified based on the 3D model. The different viewpoints may be selected such that user-perceivable views of the object, when the object is rendered as part of a virtual environment, are obtained for comparison. For example, for objects that have an inner portion and an outer portion, it is possible that the inner portion is not visible during use. For example, the inside of a shirt or hat worn by a virtual avatar, may not seen in use and thus, corresponding views may be excluded from comparison with other objects to identify counterfeits. In another example, when the object is a jacket, both inside and outside views may be used for comparison, while top and/or bottom views may be excluded. In some implementations, the category type of the object, e.g., footwear, headwear, shirt, accessory, etc. may be utilized to determine the different views used for comparison. For example, each category type may have a predefined list of associated views to be used for comparison to identify counterfeit objects.

In some implementations, the different viewpoints may be captured first, and a subset of the captured 2D views may be selected for comparison, based on the category type of the 3D object. In some implementations, the category type may be determined first, and 2D images selected for that category type may be captured for comparison.

In some implementations, the 2D views captured of the received virtual 3D object are compared to corresponding 2D views of authentic virtual 3D objects. In some implementations, the corresponding 2D views of authentic virtual 3D objects may be stored, for example, in data store 120.

In some implementations, the corresponding 2D views of authentic virtual 3D objects are rendered at a time of comparison, for example, by gaming server 102.

In some implementations, the comparison of 2D views of the received virtual 3D object with 2D views of authentic virtual 3D objects utilizes hash matching of the 2D images. In some implementations, approximate hash matching (fuzzy matching) is utilized to compare 2D views of the received virtual 3D object with 2D views of authentic virtual 3D objects to detect similar 2D views.

A hash value is computed for each 2D image and serves as a fingerprint or watermark for the image. The hash value may be an alphanumeric value of a fixed length and structure and may be generated by a hash function that takes an input record (for example, a 2D image file) and generates a corresponding hash value In some implementations, approximate hash matching techniques may be utilized to determine that the images being compared are not identical, but are similar in that they lie within a threshold distance of each other, where the distance between image hashes is a measure of their likeness. In some implementations, perceptual hash techniques may be utilized, which utilizes hash functions and thresholds that determine whether the 2D images being compared are likely similar. For example, the perceptual hash techniques may be utilized to determine whether the 2D images being compared have similar features. Further, the techniques are resistant to adversarial manipulation, e.g., that attempt to pass off counterfeit objects as genuine.

Perceptual hash functions may be utilized to extract features of interest from the images to calculate a hash value based on the features. Perceptual hash functions may be designed such that a hash values (computed using a perceptual hash function) of an original object and an object to be authenticated are mathematically close when the objects are perceptually similar (for example, visually similar), and distant when the objects are perceptually dissimilar.

In this illustrative example, based on the comparison, it is determined that virtual 3D object 310 is not a replica (i.e. is a genuine object) of authentic virtual 3D object 320, and that virtual 3D object is a counterfeit of authentic virtual 3D object 330. As can be seen in the figure, the object 320, while a hat, has a different outer shape and dimensions than the hat 310. Further, the hat 310 is similar to hat 330, even though in the bottom view 310c, it has additional content (heart sign 350) that is not present in the authentic hat 330. In this instance, since the bottom view of the hat is not seen during use of the virtual object in a virtual environment, e.g., when the hat is worn by a virtual avatar, such a non-matching view may be weighted less when determining whether the object is a counterfeit. However, it may be understood that in some instances, a single mismatch may still be indicative of the object being a genuine object. For example, for accessories such as trekking poles, the objects may be largely similar, with a small portion, e.g., the handle, being different. In such cases, the specific views may be given higher weight.

In some implementations, parameterized weighting of the different views may be utilized, wherein some views are weighted differently from others. For example, in the example described in FIG. 3, the bottom views, 310b, 320b, and 330b, may be weighed to a lesser extent (or not at all) than the other views since that particular view (i.e. the interior of a hat) may not be viewed by a human user, when worn by an avatar. This enables detection of counterfeit objects where the counterfeiter has made modifications to the 3D object with a view to circumvent hash based matching, but the modifications to the 3D model are in views that are less important from a user perspective.

In some implementations, predetermined weights may be specified for each type of virtual 3D object. In some implementations, hash values of an original object may be pre-computed and stored. In some implementations, views of the original object may be stored.

Figure 4:
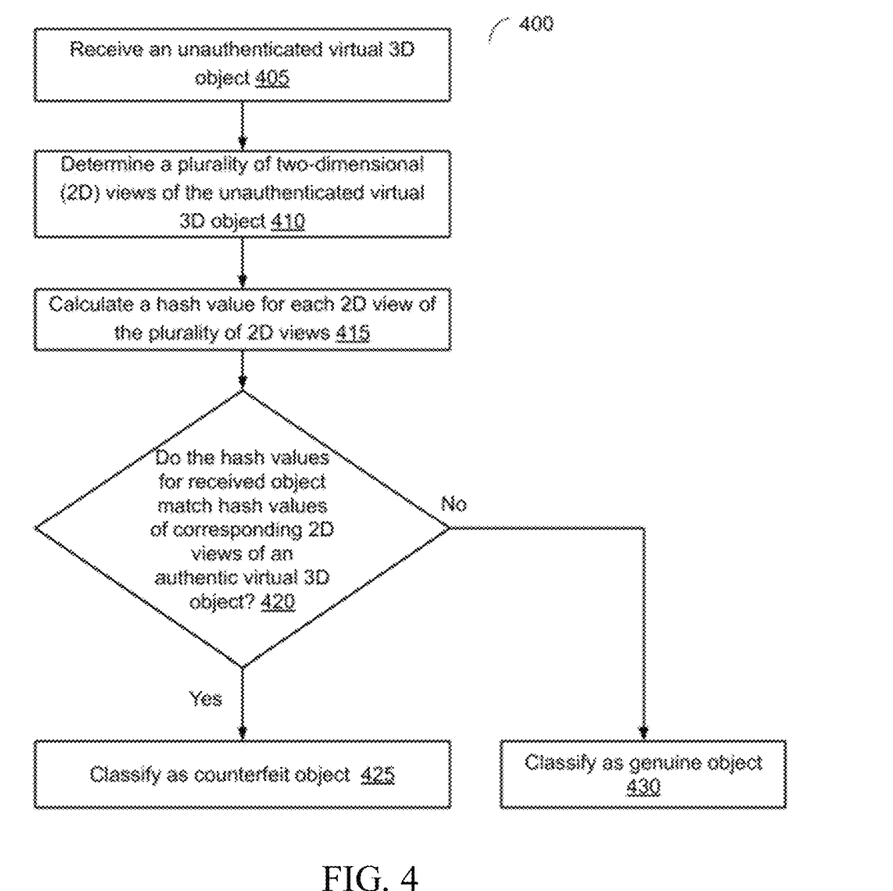
FIG. 4 is a flowchart illustrating an example method to detect counterfeit virtual objects, in accordance with some implementations.

FIG. 4 is a flowchart illustrating an example method to detect counterfeit virtual objects, in accordance with some implementations. In some implementations, method 400 can be implemented, for example, on gaming server 102 described with reference to FIG. 1.

Processing begins at block 405, where an unauthenticated virtual 3D object is received. The virtual 3D object may be provided in a virtual 3D environment, such as a game 106, for utilization in the virtual 3D environment by one or more users. For example, the unauthenticated virtual 3D object may be received via an upload to gaming server 102 by a developer using developer device 130.

In some implementations, the virtual 3D object may include a 3D mesh. The 3D mesh may define a three-dimensional structure of the unauthenticated virtual 3D object. In some implementations, the 3D mesh may also define one or more surfaces of the unauthenticated virtual 3D object. In some implementations, the unauthenticated virtual 3D object may be a virtual avatar, e.g., a virtual character such as a humanoid character, an animal-character, a robot-character, etc.

In some implementations, the mesh may be received (imported) in a FBX file format. The mesh file includes data that provides dimensional data about polygons that comprise the virtual 3D object and UV map data that describes how to attach portions of texture to various polygons that comprise the virtual 3D object.

In some implementations, the unauthenticated virtual 3D object may include an animation that defines one or more movements of the object, e.g., an arm movement of a humanoid character, a tail movement of a cat character, etc. In some implementations, the unauthenticated virtual 3D object may correspond to an accessory, e.g., a hat, a weapon, a piece of clothing, etc. worn by a virtual avatar or otherwise depicted with reference to a virtual avatar.

In implementations where the unauthenticated virtual 3D object is an accessory, data indicative of use of the object in a virtual game may also be received. For example, a "shoe" object may include annotations indicating that the object can be depicted as being worn on the feet of a virtual humanoid character, while a "shirt" object may include annotations that it may be depicted as being worn on the torso of a virtual humanoid character.

In some implementations, the 3D model may further include texture information associated with the unauthenticated virtual 3D object. For example, texture information may indicate color and/or pattern of an outer surface of the unauthenticated virtual 3D object. The texture information may enable varying degrees of transparency, reflectiveness, degrees of diffusiveness, material properties, and refractory behavior of the textures and meshes associated with the virtual 3D object. Examples of textures include grass, a pane of light blue glass, ice, water, concrete, brick, carpet, wood, etc.

In some implementations, the unauthenticated virtual 3D object may include a user provided label that may serve as a descriptor of the virtual 3D object. For example, a label may indicate a name of the object, e.g., "fun robot," "action robot," "top hat," "cool jacket," etc. Block 405 may be followed by block 410.

At block 410, a plurality of two-dimensional (2D) views of the virtual 3D object are generated. In some implementations, at least two 2D views are generated that are captured from respective viewpoints. In some implementations, the 2D views may be obtained under specific predetermined lighting conditions suited to the virtual 3D object. In some implementations, two or more 2D views may be captured with the same viewpoint, but with different lighting conditions in use. For example, when the texture of a virtual object is such that it interacts with the light (e.g., reflects the light differently based on incident angle), different lighting conditions may be utilized.

In some implementations, the viewpoints for the 2D views are selected based on a category type of the unauthenticated virtual 3D object. For example, inner views may be selected for accessories such as open jackets, where the inside of the jacket may be visible, when the jacket is depicted in a virtual game, e.g., being worn by a virtual avatar, or otherwise depicted in the space of the virtual game. In another example, top and/or side views may be selected for hats. In another example, bottom and side views may be selected for shoes rather than for hats, etc.

In some implementations, for objects that include one or more partially transparent polygons, viewpoints and lighting vectors that cover all of the permutations of compound transparency may be included, in order to ensure that all features are extracted.

In some implementations, for objects that include transitions in refraction, viewpoints with and without the transitions may be selected. For example, if the received 3D virtual object is a fish inside water, viewpoints may include views that look into the water from above the surface at the fish as well as views that are looking at the fish underwater.

In some implementations, the category may be determined from a user provided label. In some implementations, the category type may be determined by the gaming platform (for example, using gaming server 102) based on features of the virtual 3D object. For example, the category type may be determined based on the shape and/or size of the virtual 3D object. In some implementations, a set of category types may be determined based on features identified in the virtual 3D object.

In some implementations, the viewpoint(s) are determined based on a user visible portion of the virtual 3D object when the object is rendered in a virtual 3D environment. For example, the viewpoint(s) may be determined based on likely portion(s) of the virtual 3D object that would be visible to a user viewing the virtual 3D object within a virtual environment or game. In some implementations, the user visible portion may depend on a pose of the virtual avatar. For example, in some implementations, an inside of a virtual hat may not be selected as a viewpoint based on a determination that the virtual hat is worn by a character (e.g. avatar) within the game. In some implementations, an inside of a virtual hat may be selected as a viewpoint if it is determined that the virtual hat is waved around in the virtual environment and that the inside of the virtual hat is visible to a user viewing the virtual hat within the game. Block 410 may be followed by block 415.

At block 415, a hash value is calculated for two or more of the 2D views. In some implementations, the hash value is calculated using a perceptual hash function. A perceptual hash function may be utilized to enable a determination of perceptual similarity of digital media content such as image files, animation, etc. Perceptual hash functions may be utilized to extract features of interest from the media content and calculate a hash value based on the features.

Perceptual hash functions may be designed such that a hash values (computed using a perceptual hash function) of an original object and an object to be authenticated are close when the objects are perceptually similar (for example, visually similar), and distant when the objects are perceptually dissimilar. Block 415 may be followed by block 420.

At block 420, the hash values of the 2D views of the received virtual 3D object are compared to corresponding 2D views (for example, views from the same viewpoints(s) of an authentic virtual 3D object in order to determine if the 2D views of the received virtual 3D object match corresponding 2D views of the authentic virtual 3D object. For example, a hash value of a top view of the received virtual 3D object is compared to the hash value of a top view of the authentic virtual 3D object, and so on.

In some implementations, a plurality of computed 2D views of the received virtual 3D object are compared to corresponding 2D views of an authentic virtual 3D object. The plurality of computed 2D views may include all obtained 2D views of the received virtual 3D object, or may include a subset of the obtained 2D views based on the category type (object type) of the received virtual 3D object. If a threshold number of comparisons match (i.e. views of the received object are perceptually similar to the corresponding views of the authentic object), it is determined that the received virtual 3D object is a counterfeit object.

In some implementations, the 2D views of the received virtual 3D object are compared to corresponding 2D views of similar objects, i.e. of the same category type of as the received virtual 3D object. For example, if the received virtual 3D object is a hat, the comparison of the 2D views of the received 3D virtual object is made with corresponding 2D views of other hats (or other headwear) that are stored in the game platform.

In some implementations, a distance value between the respective hash value of the plurality of 2D views and the corresponding hash value of 2D views of the authentic virtual 3D object may be computed. If at least a threshold number of the distance values meets a threshold distance value, a determination may be made that the 2D views of the received virtual 3D object match corresponding 2D views of the authentic virtual 3D object. For example, the threshold distance value may be selected such that 2D views that within the threshold distance value are visually similar. The threshold distance value may be selected based on the type of hash function used.

In some implementations, a distance value is determined between the hash value calculated for a 2D view and the hash value for the corresponding 2D view of an authentic virtual 3D object. An aggregate distance value is determined based on the distance values computed across all 2D views selected for comparison.

As described earlier, in some implementations, parameterized weighting of the different views may be utilized, wherein some views are weighted differently from others. For example, views that may be more commonly viewed by a user (viewer) within a 3D environment may weighted more than views that may be less common. For example, a view of an inside of a hat may be weighted less than a view of a top of the hat.

In 3D virtual objects that include compound transparency, views that only include a subset of available transitions may be weighted differently than views that include more (or all available) transitions.

In 3D virtual objects that are partially transparent, views that are likely to be viewed by another player may be weighted more than other views. For example, if the virtual 3D object was a pair of shoes that sported a fish tank above the top of each shoe, views of the shoes that other players would see may be weighted more than the view captured from a perspective of a fish in the fish tank.

In some implementations, the aggregate distance value is compared against a predetermined distance threshold to determine whether the received virtual 3D object is similar to the authentic virtual 3D object. In some implementations, the distance threshold may be set to a value that is based on a category type of the received virtual 3D object. In some implementations, the distance threshold may be adjusted (for example, by gaming server 102) based on previously utilized distance thresholds and objects previously classified as counterfeit or genuine objects based on those distance thresholds.

In some implementations, the threshold distance value, the predetermined distance threshold, and the threshold number of distance values may be configurable values. In some implementations, the threshold distance value, the predetermined distance threshold, and the threshold number of distance values may be set to values that are based on a category type of the received virtual 3D object.

For example, certain object categories that are counterfeited more frequently within the game platform may utilize thresholds where a smaller degree of similarity may result in the received virtual 3D object for those categories being flagged as counterfeit when compared to a received virtual 3D object that belongs to a category that is counterfeited less frequently. For example, shirts and pants are examples of virtual 3D objects that are counterfeited easily, often, and very quickly. Virtual 3D objects that involve less work to create and upload the content have a greater propensity to be copied.

In some implementations, machine learning techniques may be utilized to refine the threshold based on previously classified counterfeit objects and confirmation of their counterfeit nature using other techniques (for example, by manual authentication). In some implementations, detection of counterfeit animation work may utilize perceptual hashing of a video of the rendered animation.

In some implementations, when the virtual 3D object is a 3D model that includes a texture, 2D views of the virtual 3D object are captured that include the texture after it is applied to mesh polygons associated with the 3D model.

In some implementations, the texture in combination with the UV mapping specified for mapping the texture onto the virtual 3D object is utilized in the perceptual hash process. For example, a perceptual hash of the texture/UV mapping of the received virtual 3D object is computed and compared to perceptual hashes of other genuine texture/UV mappings.

If it is determined at block 420 that the hash values for the 2D views of the received virtual 3D object match corresponding 2D views of an authentic virtual 3D object, block 420 is followed by block 425.

At block 425, the received virtual 3D object is classified as a counterfeit object. In some implementations, the classified counterfeit object may be excluded from a listing in a virtual platform (game platform). In some implementations, a message indicating that the object was flagged a counterfeit may be provided to the uploader and/or to an administrator of the virtual environment. In some implementations, the counterfeit object may be flagged for further review (for example, for a manual review by an administrator associated with the gaming platform).

If it is determined at block 420 that the hash values for the 2D views of the received virtual 3D object do not match corresponding 2D views of an authentic virtual 3D object, block 420 is followed by block 430.

At block 430, the received virtual 3D object is classified as a genuine object. In some implementations, the classification as a genuine object is used a signal and combined with other signals (for example, manual review of 3D objects, developer rating associated with the developer uploading the 3D object, etc.) in order to classify the virtual 3D object.

In some implementations, after classifying the unauthenticated virtual 3D object as the genuine object, the plurality of 2D views of the unauthenticated virtual 3D object may be stored (for example, on data store 120), and utilized to authenticate other virtual 3D objects that may be received subsequently. The stored genuine object may be made available for use in a virtual environment. Further, if the virtual environment enables users to buy genuine objects (e.g., by the payment of a virtual currency) or obtain access to genuine objects via a subscription, the genuine object (which is the unauthenticated virtual object after classification at block 430) is made available to users.

Blocks 405-430 can be performed (or repeated) in a different order than described above and/or one or more steps can be omitted. For example, block 420 may be performed multiple times, e.g., to compare a plurality of known authentic objects (e.g., of the same category type as the unauthenticated virtual object) with the unauthenticated virtual object. If any of the plurality of comparisons detect that the hash values match, the object may be classified as counterfeit. In this manner, portions of method 400 may be repeated until the received virtual 3D object is compared to all genuine objects of the category type (object type) that are stored in the platform. In some implementations, 2D views of authentic virtual 3D objects may be calculated for use in the comparison in block 420.

In some implementations, received virtual 3D objects on the game platform may be scanned at a predetermined frequency (e.g. everyday, every other day, every hour, etc.) to detect any counterfeit objects to mitigate user access to such objects. In some implementations, received virtual 3D objects that are more likely to be copied may be scanned at a higher frequency than virtual 3D objects that are less likely to be copied. In some implementations, method 400 may be performed each time a new object is received via upload. In some implementations, method 400 may be performed when a stored object is modified.

In some implementations, user feedback regarding counterfeit objects they encounter on the platform may be utilized to update the threshold distance and method 400 may be performed for one or more previously authenticated objects.

In some implementations, the classification as a genuine object is used a signal and combined with other signals (for example, manual review of 3D objects, developer rating associated with the developer uploading the 3D object, etc.) in order to classify the virtual 3D object.

In some implementations, after classifying the unauthenticated virtual 3D object as the genuine object, the plurality of 2D views of the unauthenticated virtual 3D object may be stored (for example, on data store 120), and utilized to authenticate other virtual 3D objects that may be received subsequently.

Figure 5:
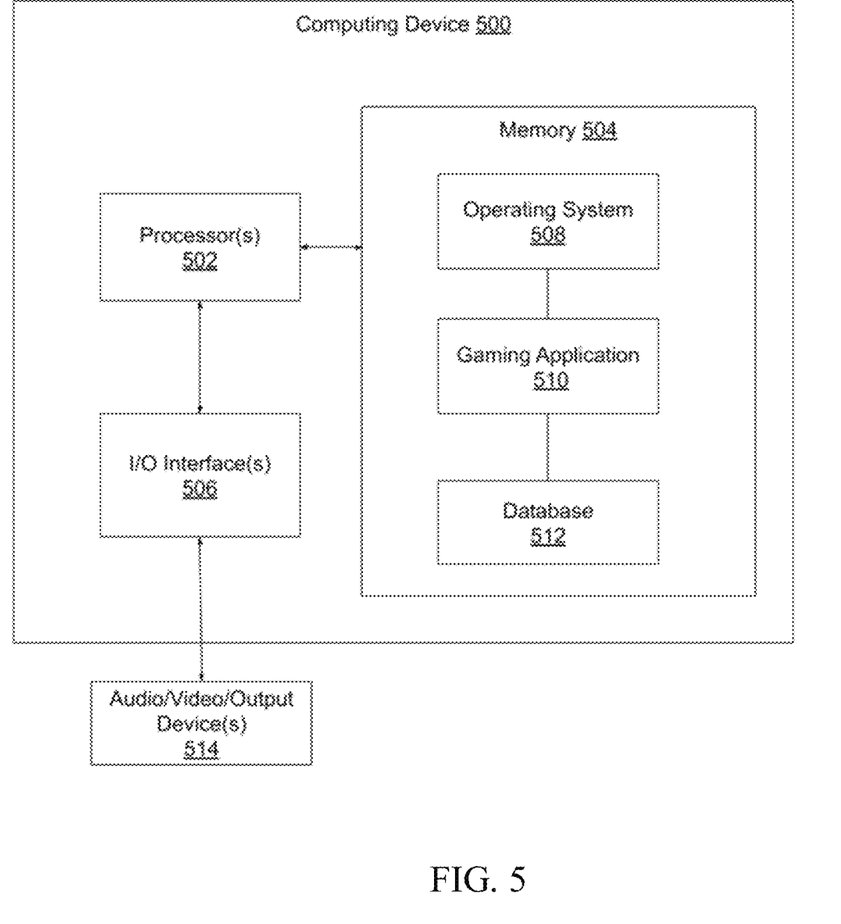
FIG. 5 is a block diagram illustrating an example computing device, in accordance with some implementations.

FIG. 5 is a block diagram of an example computing device 500 which may be used to implement one or more features described herein. In one example, device 500 may be used to implement a computer device (e.g. 102 and/or 110 of FIG. 1), and perform appropriate method implementations described herein. Computing device 500 can be any suitable computer system, server, or other electronic or hardware device. For example, the computing device 500 can be a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, device 500 includes a processor 502, a memory 504, input/output (I/O) interface 506, and audio/video input/output devices 514.

Processor 502 can be one or more processors and/or processing circuits to execute program code and control basic operations of the device 500. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 504 is typically provided in device 500 for access by the processor 502, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 502 and/or integrated therewith. Memory 504 can store software operating on the server device 500 by the processor 502, including an operating system 508, one or more applications 510, e.g., an audio spatialization application and application data 512. In some implementations, application 510 can include instructions that enable processor 502 to perform the functions (or control the functions of) described herein, e.g., some or all of the method described with respect to FIG. 4.

For example, applications 510 can include an audio spatialization module 512, which as described herein can provide audio spatialization within an online gaming server (e.g., 102). Any of software in memory 504 can alternatively be stored on any other suitable storage location or computer-readable medium. In addition, memory 504 (and/or other connected storage device(s)) can store instructions and data used in the features described herein. Memory 504 and any other type of storage (magnetic disk, optical disk, magnetic tape, or other tangible media) can be considered "storage" or "storage devices."

I/O interface 506 can provide functions to enable interfacing the server device 500 with other systems and devices. For example, network communication devices, storage devices (e.g., memory and/or data store 120), and input/output devices can communicate via interface 506. In some implementations, the I/O interface can connect to interface devices including input devices (keyboard, pointing device, touchscreen, microphone, camera, scanner, etc.) and/or output devices (display device, speaker devices, printer, motor, etc.).

The audio/video input/output devices 514 can include a user input device (e.g., a mouse, etc.) that can be used to receive user input, a display device (e.g., screen, monitor, etc.) and/or a combined input and display device, that can be used to provide graphical and/or visual output.

For ease of illustration, FIG. 5 shows one block for each of processor 502, memory 504, I/O interface 506, and software blocks 508 and 510. These blocks may represent one or more processors or processing circuitries, operating systems, memories, I/O interfaces, applications, and/or software engines. In other implementations, device 500 may not have all of the components shown and/or may have other elements including other types of elements instead of, or in addition to, those shown herein. While the online gaming server 102 is described as performing operations as described in some implementations herein, any suitable component or combination of components of online gaming server 102 or similar system, or any suitable processor or processors associated with such a system, may perform the operations described.

A user device can also implement and/or be used with features described herein. Example user devices can be computer devices including some similar components as the device 500, e.g., processor(s) 502, memory 504, and I/O interface 506. An operating system, software and applications suitable for the client device can be provided in memory and used by the processor. The I/O interface for a client device can be connected to network communication devices, as well as to input and output devices, e.g., a microphone for capturing sound, a camera for capturing images or video, a mouse for capturing user input, a gesture device for recognizing a user gesture, a touchscreen to detect user input, audio speaker devices for outputting sound, a display device for outputting images or video, or other output devices. A display device within the audio/video input/output devices 514, for example, can be connected to (or included in) the device 500 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., method 400) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method to detect counterfeit virtual three-dimensional (3D) objects, the method comprising:
   receiving an unauthenticated virtual 3D object;
   determining a plurality of two-dimensional (2D) views of the unauthenticated virtual 3D object, wherein each view of the plurality of 2D views is captured from a respective viewpoint;
   calculating a hash value for each 2D view of the plurality of 2D views;
   determining whether the respective hash values of at least two 2D views of the plurality of 2D views of the unauthenticated virtual 3D object match hash values of corresponding 2D views of an authentic virtual 3D object, wherein determining whether the respective hash values match comprises:
      computing a distance value between the respective hash value of at least two 2D views of the plurality of 2D views and the hash value of corresponding 2D views of the authentic virtual 3D object; and
      determining that the respective hash values match based on determination that at least a threshold number of the distance values meets a threshold distance value; and
   if it is determined that the respective hash values match, classifying the unauthenticated virtual 3D object as a counterfeit 3D object.

2. The computer-implemented method of claim 1, wherein determining the plurality of 2D views of the unauthenticated virtual 3D object comprises determining the plurality of 2D views under predetermined lighting conditions.

3. The computer-implemented method of claim 1, wherein the hash value is calculated using a perceptual hash function.

4. The computer-implemented method of claim 1, wherein receiving the unauthenticated virtual 3D object comprises receiving a 3D mesh of the unauthenticated virtual 3D object.

5. The computer-implemented method of claim 4, wherein the 3D mesh comprises texture information.

6. The computer-implemented method of claim 1, wherein the at least two 2D views are selected based on a category of the unauthenticated virtual 3D object.

7. The computer-implemented method of claim 1, further comprising wherein the viewpoint is determined based on a user visible portion of the virtual 3D object.

8. The computer-implemented method of claim 7, wherein the virtual 3D object is worn by a virtual avatar and the user visible portion depends on a pose of the virtual avatar.

9. The computer-implemented method of claim 1, further comprising after classifying the unauthenticated virtual 3D object as the counterfeit 3D object, excluding the counterfeit 3D object from a listing in a virtual platform.

10. The computer-implemented method of claim 1, further comprising performing the determining a plurality of times, wherein the determining is performed each of the plurality of times with a different authentic virtual 3D object.

11. The computer-implemented method of claim 1, further comprising if it is determined that the respective hash values do not match, classifying the unauthenticated virtual 3D object as a genuine 3D object.

12. The computer-implemented method of claim 11, further comprising after classifying the unauthenticated virtual 3D object as the genuine 3D object, storing the plurality of 2D views of the unauthenticated virtual 3D object.

13. A computer-implemented method to detect counterfeit virtual three-dimensional (3D) objects, the method comprising:
   receiving a 3D mesh of an unauthenticated virtual 3D object;
   determining a plurality of two-dimensional (2D) views of the unauthenticated virtual 3D object, wherein each view of the plurality of 2D views is a rendered view of the 3D mesh of the unauthenticated virtual 3D object captured from a respective viewpoint;

calculating a hash value for each 2D view of the plurality of 2D views;

determining a plurality of distance values, wherein each distance value is indicative of distance between a respective hash value of a 2D view of the plurality of 2D views and a hash value of a corresponding 2D view of an authentic virtual 3D object;

determining an aggregate distance value based on the plurality of distance values; and classifying the unauthenticated virtual 3D object as a counterfeit 3D object if the aggregate distance value meets a predetermined threshold distance value.

14. The computer-implemented method of claim 13, wherein an object type of the unauthenticated virtual 3D object and the object type of the authentic virtual 3D object are the same.

15. The computer-implemented method of claim 14, wherein the plurality of 2D views are selected based at least in part on the object type of the unauthenticated virtual 3D object.

16. The computer-implemented method of claim 13, wherein determining the plurality of 2D views of the unauthenticated virtual 3D object comprises determining the plurality of 2D views under predetermined lighting conditions.

17. The computer-implemented method of claim 13, further comprising performing the determining a plurality of times, wherein the determining is performed each of the plurality of times with a different authentic virtual 3D object.

18. The computer-implemented method of claim 13, further comprising classifying the unauthenticated virtual 3D object as a genuine 3D object if the aggregate distance value does not meet a predetermined threshold distance value.

19. A non-transitory computer-readable medium comprising instructions that, responsive to execution by a processing device, causes the processing device to perform operations comprising:

receiving a 3D mesh of an unauthenticated virtual 3D object;

determining a plurality of two-dimensional (2D) views of the unauthenticated virtual 3D object, wherein each view of the plurality of 2D views is a rendered view of the 3D mesh of the unauthenticated virtual 3D object captured from a respective viewpoint;

calculating a hash value for each 2D view of the plurality of 2D views;

determining a plurality of distance values, wherein each distance value is indicative of distance between a respective hash value of a 2D view of the plurality of 2D views and a hash value of a corresponding 2D view of an authentic virtual 3D object;

determining an aggregate distance value based on the plurality of distance values; and classifying the unauthenticated virtual 3D object as a counterfeit 3D object if the aggregate distance value meets a predetermined threshold distance value.

20. The non-transitory computer-readable medium of claim 19, wherein determining the plurality of 2D views of the unauthenticated virtual 3D object comprises determining the plurality of 2D views under predetermined lighting conditions.

21. The non-transitory computer-readable medium of claim 19, wherein the hash value is calculated using a perceptual hash function.

22. The non-transitory computer-readable medium of claim 19, wherein the plurality of views are selected based at least in part on an object type of the unauthenticated virtual 3D object.

23. The non-transitory computer-readable medium of claim 19, wherein the operations further include classifying the unauthenticated virtual 3D object as a genuine 3D object if the aggregate distance value does not meet the predetermined threshold distance value.

24. A system comprising:

a memory with instructions stored thereon; and a processing device, coupled to the memory, the processing device configured to access the memory and execute the instructions, wherein the instructions cause the processing device to perform operations including:

receiving a 3D mesh of an unauthenticated virtual 3D object;

determining a plurality of two-dimensional (2D) views of the unauthenticated virtual 3D object, wherein each 2D view of the plurality of 2D views is a rendered view of the 3D mesh of the unauthenticated virtual 3D object captured from a respective viewpoint;

calculating a hash value for each 2D view of the plurality of 2D views;

determining whether the respective hash values of at least two 2D views of the plurality of 2D views of the unauthenticated virtual 3D object match hash values of corresponding 2D views of an authentic virtual 3D object; and if it is determined that the respective hash values match, classifying the unauthenticated virtual 3D object as a counterfeit 3D object.

25. The system of claim 24, wherein the hash value is calculated using a perceptual hash function.

26. The system of claim 24, wherein the plurality of views are selected based at least in part on an object type of the unauthenticated virtual 3D object.

27. The system of claim 24, wherein the operations further comprise performing the determining a plurality of times, wherein the determining is performed each of the plurality of times with a different authentic virtual 3D object.

28. The system of claim 24, wherein the operations further comprise if it is determined that the respective hash values do not match, classifying the unauthenticated virtual 3D object as a genuine 3D object.

29. The system of claim 24, wherein the operations further comprise, after classifying the unauthenticated virtual 3D object as the counterfeit 3D object, excluding the counterfeit 3D object from a listing in a virtual platform.

* * * * *